Nov. 3, 1942.　　　J. HALTENBERGER　　　2,300,502
AUTOMOBILE
Filed July 20, 1939　　　2 Sheets-Sheet 2

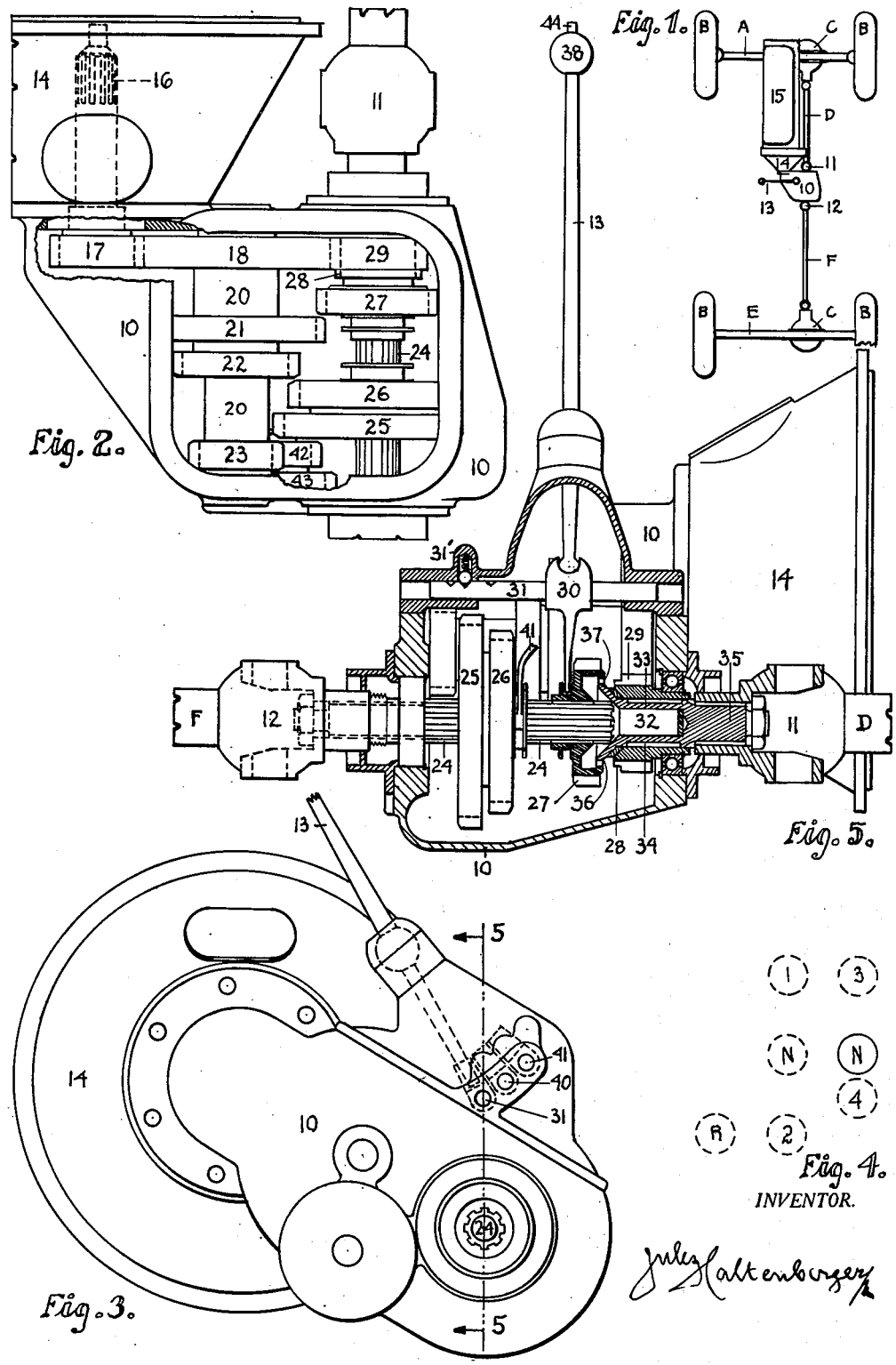

INVENTOR.
Jules Haltenberger

Patented Nov. 3, 1942

2,300,502

UNITED STATES PATENT OFFICE 2,300,502

AUTOMOBILE

Jules Haltenberger, Ann Arbor, Mich.

Application July 20, 1939, Serial No. 285,538

6 Claims. (Cl. 74—333)

The present application is a modification of my copending application for "Automobile" Serial No. 68,376, filed May 13, 1936.

Our Government—the principal users of four-wheel drives—prefers the use of "standard" engines and demands that the engine should be easily accessible for servicing. Constructions which applicant is aware of include a multiple speed change speed mechanism or transmission, controlled by a usual change speed lever. This transmission, by a short propeller shaft, is arranged to drive a transfer case, usually having eight anti-friction bearings, three shaft protrusion oil seals, and five gears. The transfer case is controlled by another change speed lever, and is arranged to drive a rear axle by a centrally disposed steep-working angle propeller shaft and by a laterally disposed propeller shaft interconnecting the transfer case and driving front axle.

It is here proposed to combine the transmission and transfer case preferably by using the usual countershaft as a spacer, and to control it by a single lever or provide it with a single control while maintaining a thorough accessibility for the engine.

A further object of my invention is to provide a similarly offset front and rear driving axles and to interconnect them with but two propeller shafts while eliminating steep-working angles.

A further object is to provide a single control for changing five to nine speeds that automatically cancels the drive of one axle, preferably the front wheel drive, for high speed transportation.

Further and more particularly expressed objects of the invention will appear as the description proceeds.

Figure 8:
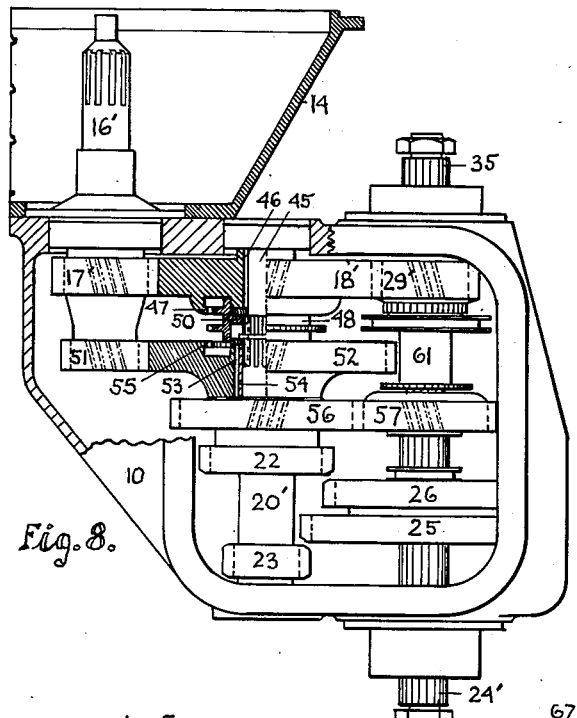
Figure 10:
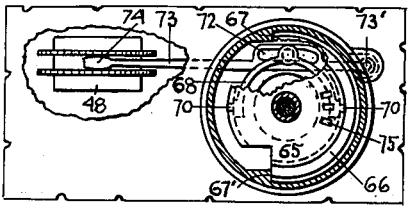
Figure 11:
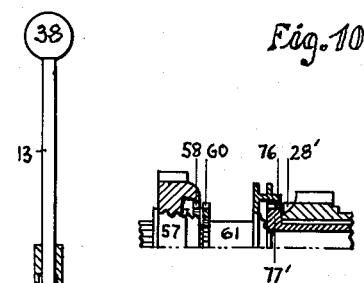
Figure 7:
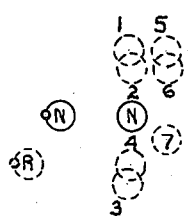
Figure 9:
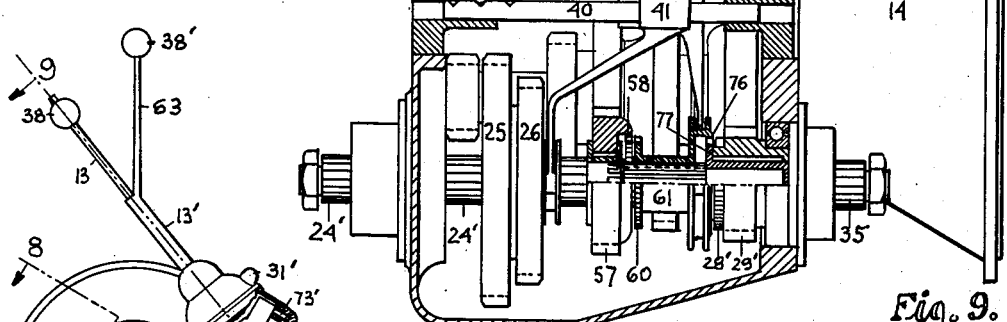
Figure 6:
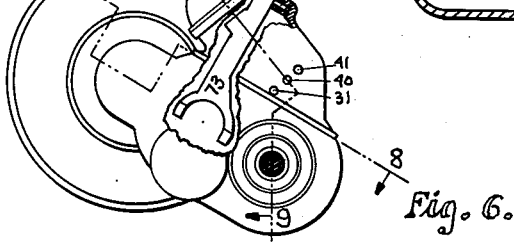

My invention may be embodied in the forms illustrated: Here Fig. 1 is a plan view of a four wheel drive automobile; Fig. 2 is substantially a plan view of the transmission, with parts left off, and illustrated in a larger scale; Fig. 3 is a rear elevation of the transmission; Fig. 4 indicates the selective change speed lever ball positions as viewed from the driver's seat; Fig. 5 is a section substantially on line 5—5 of Fig. 3; Fig. 6 is a modification of the invention, showing a rear elevation of the transmission similar to Fig. 3, here illustrated in a smaller scale; Fig. 7 indicates the selective change speed lever ball positions as viewed from the driver's seat; Fig. 8 is a section substantially on line 8—8 of Fig. 6, illustrated in a larger scale; Fig. 9 is a section substantially on line 9—9 of Fig. 6; Fig. 10 is a section substantially on line 10—10 of Fig. 9; Fig. 11 is a modification of the front axle drive cancellation device illustrated in Fig. 9.

Referring to Figs. 1-5 inclusive, it will be seen that front driving axle A is provided with steerable driving wheels B and offset differential in housing C arranged to be driven by front propeller shaft D. Rear driving axle E is also provided with driving wheels B and similarly offset differential in housing C, arranged to be driven by rear propeller shaft F. These propeller shafts are interconnected by a transmission in housing 10, having a front universal joint 11 and rear universal joint 12. The transmission is controlled by lever 13 and it is supported by clutch housing 14 on "standard" engine 15 in the usual manner.

Clutch housing 14 surrounds a usual clutch shaft 16, terminating in driving pinion 17 constantly engaging a usual countershaft gear 18, integral with a countershaft 20 and the usual reduction gears 21, 22 and 23.

From clutch shaft 16 laterally and downwardly is remotely placed a splined shaft 24 by the use of the usual countershaft and countershaft gear respectively.

Splined shaft 24 is provided with unitary sliding gears 25 for first speed and reverse, and 26 for second speed respectively, and is also provided with a small sliding gear 27 for third speed, and direct drive when engaging stub teeth 28 of hollow driven pinion 29, which is in constant mesh with countershaft gear 18.

The drawings illustrate the change speed lever 13 (and thereby solely controlled gear positions) as being in the high speed gate neutral position. That is: in engagement with shifter fork 30 and fork rod 31 respectively, having a spring loaded "locator" in boss 31', and engaging gear 27.

As it is clear from Fig. 5, splined shaft 24 at the rear (left side of the drawing) is directly connected to rear universal joint 12 and propeller shaft F. The front end of this shaft, however, terminates in a cylindrical smooth bearing end 32. Outside of end 32 and inside the hollow driven pinion 29 is placed a tubular member 33, having needle bearings 34, forwardly terminating in splined portion 35, directly connected to front universal joint 11 and propeller shaft D. Rearwardly it is formed into a conical shape having concentric external engaging jaws 36 of the same number and size as stub teeth 28 of pinion 29, here, however, shown in engagement with gear 27 also having internal jaws 37 of the same number but slightly larger than stub teeth 28 to permit fore and aft sliding of gear 27.

In operation, as the change speed lever is illustrated in high gate neutral position, power transferred by the clutch shaft will not be transmitted to the splined shaft. It is important to note that in this position the front and rear universal joints and their respective shafts are interconnected by jaws 36 and 37, permitting four wheel drive.

When moving the change speed lever 13 forward by ball 38, sliding gear 27 moves rearwardly, engaging gear 21 on the countershaft and disconnecting jaws 36 and 37 (the front wheel drive connection) resulting in a purely rear wheel drive third speed. When moving ball 38 from its neutral position rearwardly, gear 27 moves forward, first disengaging jaws 36 and 37 (the front wheel drive connection), resulting in a purely rear wheel fourth or "direct" drive.

When the change speed lever is rocked to the left as viewed in Fig. 3, gear 27 remains in the position illustrated and jaws 36 and 37 interconnect the two universal joints for a four wheel drive, and as in all sliding gear transmissions low gate neutral will be reached. This position is controlled by shifter rod 40 having shifter fork 41 (see Fig. 5) in engagement with sliding gears 25 and 26. From this neutral position forward movement of ball 38 will move gear 25 to an engagement with gear 23, resulting in a four wheel drive first speed. The rearward movement of the ball will engage gear 26 with gear 22, resulting in a four wheel drive second speed.

The four wheel drive reverse is controlled by a usual reverse gate on shifter fork rod 41. It is but indicated in Fig. 2 where usual integral reverse gears 42 and 43 are arranged to slide forwardly to engage gears 25 and 23 in the usual manner. The usual reverse safety latch is not shown; it is merely indicated by button 44 on gear shifter ball 38.

The above described construction has many advantages. It reduces manufacturing costs abouty fifty dollars, creates but one transmission oil chamber, reduces weight and oil seals, and facilitates servicing. The automatic front drive cancellation at high speeds reduces tire wear. The mechanism is fool proof, an important item for military service.

My construction is not limited to four forward speeds and reverse, nor is it limited to sliding gears, as multiple speeds and constant mesh gears might be used. This is illustrated in Figs. 6–10 inclusive. Here for simplicity of presentation only the modifications will be described. The drawings here illustrate the change speed lever as in the low speed gate neutral position.

Here clutch shaft 16' is provided with a spiral driving pinion 17' constantly engaging a countershaft gear 18' rotatively mounted on the smooth bearing end 45 of a built-up countershaft 20' as by roller bearings 46. Gear 18' is also in constant engagement with driven pinion 29'. Gear 18' is provided with internal engaging jaws 47 here shown while in engagement with the external jaws of shifter 48. The inner center wall 50 of this shifter is slidably splined to reduced diameter spline of shaft 20'. In the illustrated position the countershaft is in "high."

Shaft 16' is also provided with a smaller driving pinion 51 in constant engagement with large countershaft gear 52, mounted on needle bearings 53 on a sleeve 54, carried by press fit on the reduced diameter of shaft 20'. Gear 52 is also provided with internal jaws 55 to mate with the external jaws of shifter 48 when same is moved to the opposite extreme position for countershaft "low" drive.

This construction provides selective speeds for the countershaft, and for all speeds driven by the countershaft. Integral with the countershaft is spiral gear 56, in constant mesh with needle bearing mounted gear 57 on splined shaft 24'. Gear 57 is provided with internal jaws 58 to be engaged with external jaws 60 of shifter 61 which is slidably splined mounted on the reduced diameter spline of shaft 24'. Shifter 61 is illustrated in the neutral position. It now simply interconnects the front wheel splined drive shaft 35 with the rear wheel drive splined shaft 24' for four wheel drives.

As it is clear from the drawings, change speed lever 13 is now engaged with shifter rod 40 and shifter fork 41 respectively, controlling slow speed sliding gears 25 and 26. The change speed lever 13 is also provided with a surrounding tubular lever 13' having thereon an offset arm 63 and shifting lever ball 38'.

Tubular lever 13' on the bottom terminates in a notched bell 65, having a flange 66. This flange terminates at the lubricated control walls 67 and 67'. At the bottom of bell 65 a half moon lever 68 is mounted on fulcrum pins 70. The mid-section of half moon lever 68 is provided with a pin 71 constantly engaged in a longitudinal slot 72 of a rocking countershaft change speed lever 73 having a fulcrum pin 73' and a shifting fork end 74. Bell 65 is also provided with three slots 75 (Fig. 10) to engage a usual spring loaded ball "locator" in boss 31' (Fig. 6).

It will be noted from Fig. 8 that the countershaft change speed shifter is now in "high"; that is, the countershaft is driven by gears 17' and 18'.

The operation is as follows: When moving ball 38' forward (as tubular lever 13' is prevented from turning around lever 13 by the front end of flange 66 riding on oiled wall 67), gear 25 will slide backward to engage gear 23 on the countershaft, creating the second speed. Now, continued forward movement of ball 38' is possible as the upper surface of flange 66 travels to a position that is below the bottom of wall 67, resulting in a slight turn of tubular lever 13' around the now stationary lever 13 (here shown about 20° each way). The turning of tubular lever will equally turn pin 71 in an arc around the lever 13.

The slot 72, however, that pin 71 is constantly engaged in, is substantially straight; consequently, at turning of lever 13' a slight rocking motion will be transmitted to lever 73 and fork end 74 respectively, thus moving shifter 48 from the "high" countershaft speed position to "low" position. This creates the first (lowest) four wheel drive speed. When moving the ball 38' slightly backward, in the first stage it will turn around lever 13, establishing the "high" for the countershaft; this is the second four wheel drive speed. After passing the neutral position, extreme backward position will make the third four wheel drive speed. This becomes possible by the engagement of gear 26 with 41, by the rear end of flange 66 riding on control wall 67', and by lever 73 rocking in the same direction at the either direction turning of lever 13'. The pin 71 normally is in substantially central position in slot 72. From the extreme back position of ball 38' slight forward movement will result in the fourth four wheel drive speed.

For further forward speed changes, lever 13', when in neutral position, is rocked to the usual extreme right position (high speed gate) and the bottom end of lever 13 will be in shifter fork 30' on shifter rod 31. It will be noted that the upper end of fork 30' is provided with a rearwardly widened gate to assure an equal angle of shifter lever forward travel to the previously discribed speeds, notwithstanding that the engagement of gear 57 by shifter 61 to shaft 24' will occur only at the end of the travel of lever 13, and at the same time internal jaws 76 in shifter 61 will disengage the external jaws on front wheel drive flange 77 on shaft 35. The equalization of lever travels permits the inclusion of the countershaft speed change as described in connection with the first and third speeds.

In this gate the extreme forward position of ball 38' will result in the fifth speed rear wheel drive. Slight backward movement will give the sixth speed rear wheel drive. After passing the neutral position in this gate the rearward position of ball 38' will give the direct or seventh speed rear wheel drive as jaws 76 pass from flange 77 to jaws 28' on pinion 29'.

Ball 38 is provided with a reverse safety latch 44 and in the preferred form this ball should be used only for four wheel drive reverse or low reverse, though it is capable of giving the second and fourth four wheel drives and the sixth and seventh rear wheel drives.

Applicant believes that the here presented seven forward speed transmission having a combined motion (travel and turn) single control and automatic front wheel drive eliminator or engager is foolproof, and inexpensive.

The transmission described in connection with Figs. 6–10 has 2 four wheel drive reverse speeds, four low four wheel drive forward speeds, and three higher rear wheel drive speeds. When it is desired to have all four wheel drive speeds except the fastest speed this is illustrated in Fig. 11.

Here, front wheel drive flange 77' is made wide enough to assure constant engagement with internal jaws 76 even when jaws 58 and 60 are fully engaged. This results in four wheel drive. At forward slide of shifter 61 jaws 76 leave the flange 77' and engage jaws 28' for a rear wheel drive.

What applicant claims as his invention is:

1. In an automobile transmission, a housing, a power input shaft having a driving pinion, a spacing counter-shaft having a gear in engagement with said pinion, a laterally disposed power output shaft unit including a pair of aligned power output shafts a driven pinion operatively supporting said power output shafts with their inner ends in co-acting relation in engagement with said gear, sliding means connecting said driven pinion with one of said output shafts when moved in one direction and interconnecting said output shafts when moved in opposite direction, and change speed gearings between said counter-shaft and one of said output shafts.

2. The invention described in claim 1 where the sliding means is a high speed gear.

3. In an automobile transmission, a housing, a power input shaft having a driving pinion, a laterally disposed countershaft having a gear in engagement with said pinion, a laterally disposed power output shaft unit including a splined power output shaft, a partially hollow output shaft in alignment with said splined power output shaft, a hollow driven pinion in engagement with said gear and operatively supporting said hollow output shaft, change speed gearings between said counter-shaft and splined shaft, sliding means on said splined shaft, a change-speed lever for actuating said sliding means to connect said driven pinion and splined shaft when moved in one direction, and for interconnecting said power output shafts when moved in the opposite direction.

4. In an automobile transmission, a housing, a change-speed lever on said housing, an input shaft, a spaced countershaft, direct gearing between said shafts, a spaced splined power output shaft, gearings between said counter and output shafts, a power output shaft aligned with said splined shaft, means responding to said change-speed lever including a jaw clutch whereby at the operation of said lever the power flow to one of said output shafts is interrupted.

5. In an automobile transmission, a housing, an oscillable change-speed lever on said housing, a change-speed lever associated with said first mentioned lever having an offset control, a power input shaft having a pair of different diameter driving pinions, a built up spacing counter-shaft having constant mesh gears in engagement with said pinions, shiftable alternating clutching means between said counter-shaft and said gears, means connecting said clutching means and said second mentioned gear-shift lever whereby one of said gears is held in engagement at the oscillation of said change-speed lever and alternating said clutching means when turning said lever, a pair of laterally disposed output shafts, and change speed gearings between one of said shafts and said counter-shaft.

6. In an automobile transmission, an input shaft, a spaced countershaft, a spaced splined power output shaft, gearing between said input and countershafts, shiftable change speed gearing upon said splined shaft, gearing upon said countershaft with which said shiftable gearing is adapted to mesh to drive said splined shaft, a second power output shaft aligned with said splined output shaft, a driving connection between said power output shafts operable in one position to cause both of said power output shafts to be driven from said countershaft, and single means for shifting said shiftable change speed gear and for moving said driving connection into an inoperative position, whereby the power flow to one of said output shafts is interrupted.

JULES HALTENBERGER.